Sept. 16, 1958     T. D. MATHENY     2,851,818
MULTIPURPOSE EXTERMINATING AND/OR FUMIGATING DEVICE
Filed March 22, 1957     2 Sheets-Sheet 1
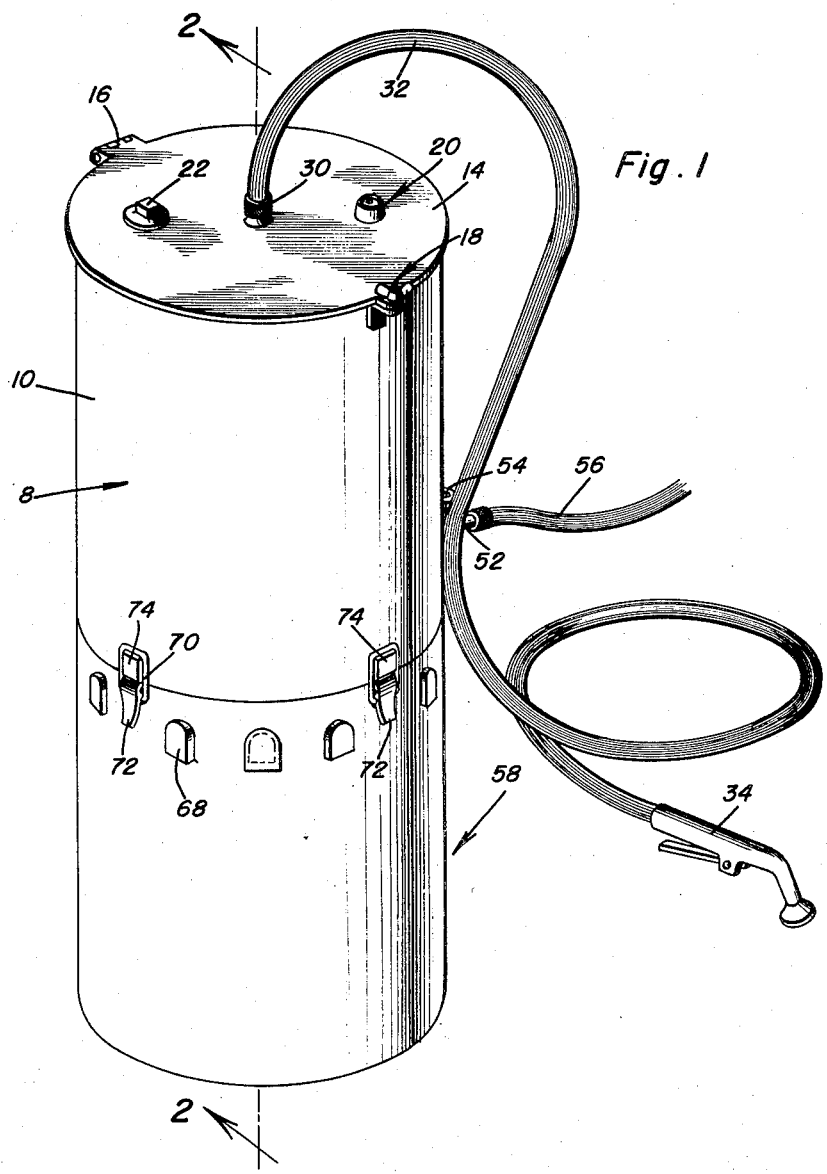
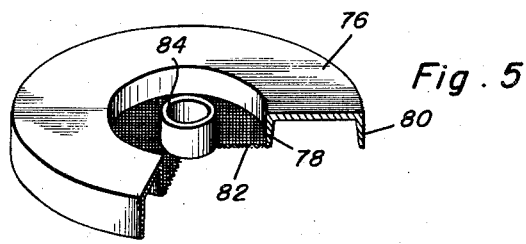
Thomas D. Matheny
INVENTOR.

Sept. 16, 1958     T. D. MATHENY     2,851,818
MULTIPURPOSE EXTERMINATING AND/OR FUMIGATING DEVICE
Filed March 22, 1957
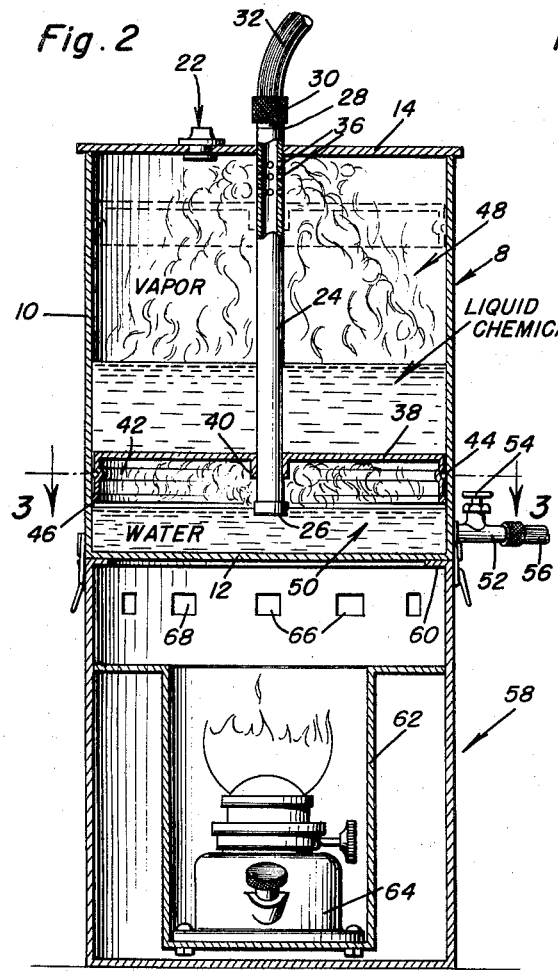
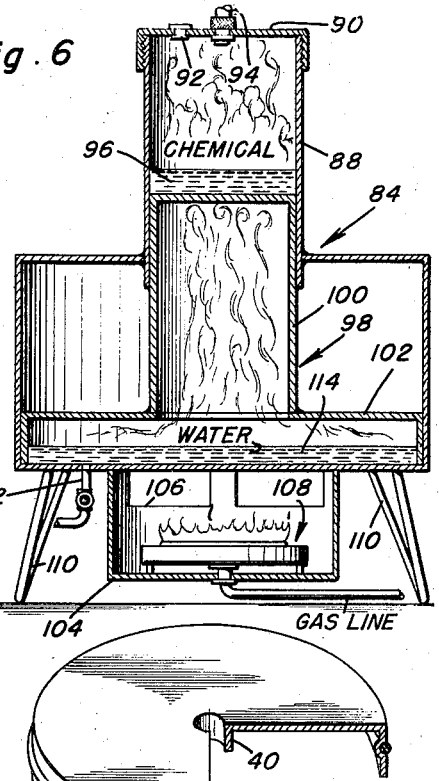
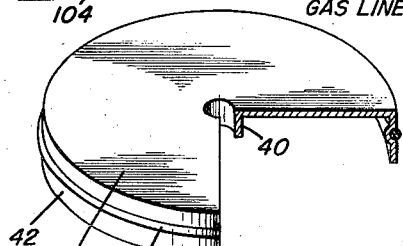
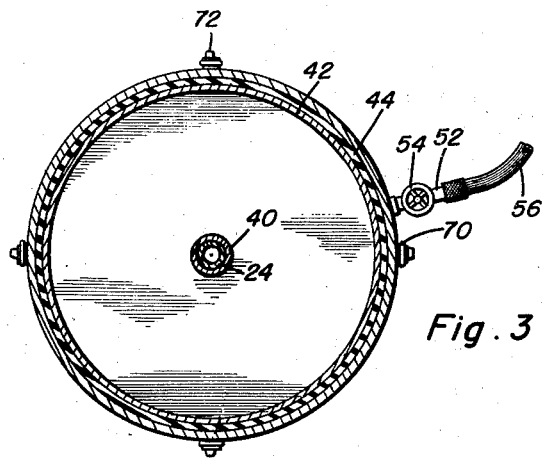
Thomas D. Matheny
INVENTOR.

United States Patent Office 2,851,818
Patented Sept. 16, 1958

2,851,818

MULTIPURPOSE EXTERMINATING AND/OR FUMIGATING DEVICE

Thomas D. Matheny, Plateau, Ala.

Application March 22, 1957, Serial No. 647,818

7 Claims. (Cl. 43—129)

The present invention relates to certain new and useful improvements in a pressure-type device for use indoors or outdoors, whichever is desired, and which is expressly constructed and designed to contain chemicals, medicaments, detergents and the like and wherein water pressure, steam pressure, or both is employed to attain the dispensing results.

More specifically, the concept has to do with a simple, practical and economical device which, while primarily intended for exterminating and fumigating needs, may be successfully utilized for a number of other purposes to be hereinafter set forth.

Briefly summarized, the invention has to do with a cylindrical tank which functions as a container for the medium which is to be placed under pressure and forcibly dispensed. The chemical or similar medium may be in liquid form or in the form of crystals or powders soluble in nature. A simple piston is mounted for reciprocation in the tank and, in effect, divides the interior or space of the tank into upper and lower chambers. The lower chamber, situated beneath the piston, is adapted to contain either still water or water under pressure from a feed line or hose. Support means, which take the form of a base, is preferably used beneath the tank. The support means is so constructed that it will accommodate a source of heat such as, for example, a lamp, gas burner or equivalent means. This construction makes it possible to utilize cold water from any suitable tap with the result that one may employ the over-all device as a vaporizer, exterminator, fumigator, automobile and window washer, fertilizing means and so on.

The tank, as mentioned, is a closed cylinder and the piston when placed under pressure is progressively elevated. An imperforate piston is utilized when the chemical in the tank is in liquid form. An alternative piston with a screened center is utilized when the chemical or product in the tank is of granular or equivalent form. The last named piston makes it practical to circulate the water under pressure upwardly through the screen to act on the chemicals and to mix therewith and to be delivered, by way of a ported pipe or tube, into a distributing nozzle-equipped hose. Or, where the hose is not used, a spray nozzle may be attached to the tube.

It is also within the purview of the concept to close the upper end of the tube after the hose is removed and to rely upon a spray nozzle when steam pressure is used to convert the liquid chemical into a vapor mist or steam.

Although the art to which the invention relates shows that it is old to utilize a container and a heat source for medicament vaporizing and room fumigating purposes, it will be evident that in the instant invention the construction is such that either liquid or dry chemicals may be successfully used and, when steam is employed, more effectual penetrating and distributing results are achieved.

Stated otherwise, the device is intended to be and is a multipurpose exterminating and fumigating device. Either liquids, crystals or powders can be used. By detaching the fire box, it can be transferred from one heating device to another. By insulating it in different ways, it will emit either hot mists or vapor from the same valve by using either water pressure and/or heat, or the heat can be left off and the water pressure used to force the mist or spray out. However, steam vapor is more effective. Inflammable chemicals may be used by mixing them with water in the tank, which mixture with water will render the chemicals from being inflammable. Both liquids and crystals can be used in the same way as will be pointed out by numbers in the drawings. This same device can be and is intended to be used for spraying lawns with either chemicals or fertilizers. It also may be used for washing cars or windows just by changing fittings in the detachable lid. It may also be used for underground exterminating wherein perforated pipe will be placed around a house or premises to create a "deadline" for any crawling insects, which this device can be attached to.

This device is further designed and adapted for the use of a hose to be attached to direct the liquids from the tank to the area desired. By the placing of detergents in the chemical tank, an automobile could be completely soaped. For that matter, any area that desired to be scrubbed down with the use of soaps or detergents could be taken care of with the use of this tank. It is believed that this device could more readily be adapted to any purpose by the use of a small length of hose to any water outlet.

This device can very readily be used for inside purposes for use as a vaporizer; that is the product to be vaporized can be placed into the tank, water placed in the water jacket and heat applied to the bottom of the tank either with the firebox or by any other heating device. Any type or appropriate fitting, other than the hose, may be installed and the vapor allowed to pass out through this fitting.

Other objects, features and advantages will become more readily apparent from the following description and the accompanying drawings:

In the drawings, wherein like numerals are employed to designate like parts throughout the views:

Fig. 1 is a perspective view of a tank-type multipurpose device constructed in accordance with the principles of the invention and showing how it is ordinarily set up for use;

Fig. 2 is a central vertical sectional and elevational view taken on the plane of the vertical line 2—2 of Fig. 1, looking in the direction of the arrows;

Fig. 3 is a horizontal section on the line 3—3 of Fig. 2;

Fig. 4 is a perspective view with a portion in section of one style or form of piston;

Fig. 5 is a similar perspective view showing a selectively usable alternative form of piston; and Fig. 6 is a view in section showing a modified tank and piston construction.

Referring now to the drawings, the tank or cylinder is hollow and imperforate and is denoted by the numeral 8. The body portion 10 and bottom 12 are imperforate. The top or cover is in the form of a simple lid 14 which fits firmly down over the top of the cylinder and is hingedly mounted on one side as at 16 and is provided with suitable retaining or fastening means on a diametrically opposite side. The numeral 20 designates a suitably constructed pressure opened valve for discharging the pressurized chemical product. The number 22 designates (not detailed) a suitable pressure relief or blow-off valve. As best shown in Fig. 2 there is a tube or pipe 24 provided and this has its lower end closed at 26 and terminating above the bottom 12. The upper end portion is screw threaded and extend through and beyond the top of the tank as at 28 where it serves to accommodate a coupling 30 on a hose 32 provided, if desired, at its outer end with a distributing and spray-forming nozzle 34. It will be seen in Fig. 2 that the upper end only of the tube is provided with orifices or ports 36. The tube serves as a stabilizer and guide for the hollow piston 38. This is an inverted pan-like piston and has a collar 40 at its center which slides up and down on the tube. The skirt or rim 42 is suitably channeled to accommodate a packing ring 44. The piston normally rests on a stop ring or shoulder 46 which is fixed in the tank above the bottom. Therefore the piston divides the tank into an upper chemical space or compartment 48 and a lower water containing compartment 50. On one side the water compartment is provided with a valved fitting 52, the valve being denoted at 54 and said fitting is adapted to accommodate a hose 56 which may be connected to a handy water tap (not shown).

The base or support means for the tank is of varying construction but in Fig. 2 it takes the form of a cylindrical body member 58 having an inturned flange 60 at its top and a well 62 at its center to accommodate a lamp, burner or other source of heat 64, the heat being applied directly to the bottom of the tank. The numerals 66 designate vents having exteriorly disposed shields 68. The tank is mounted and retained on the base by way of loop-type fasteners 70 having fingerpieces 72 and engaging over lugs 74 circumferentially spaced around the exterior of the tank.

In addition to using the imperforate type piston the concept involves the use of the hollow or inverted pan-type piston seen in Fig. 5 and denoted by the numeral 76. This is an annular member having inner and outer flanges 78 and 80 and wherein a screen serves as a center part 82 carrying a collar 84 which is slidable on the aforementioned tube 24.

In the modification shown in Fig. 6 the tank is denoted generally by the numeral 84 and has a larger lower portion 86 and a reduced cylindrical upper portion 88 which is provided with a detachable or screw threaded closure or cover 90 having a suitable valve 92 and a fitting to accommodate a hose at 94. The upper portion of the tank contains a chemical 96. The piston 98 has a reduced hollow upper portion 100 which slides in and is guided by the reduced portion 88 of the tank. The lower larger inverted pan-like portion of the piston is denoted at 102. The well or holder 104 is provided with a vent 106 to accommodate a gas burner 108 and this form of the invention may be used, if desired, for permanent rather than portable installation. The supporting legs therefor are denoted at 110 and the water supply line is denoted at 112. The water which is heated and converted into steam is denoted at 114. Here the steam is concentrated in the reduced central portion 100 of the piston and serves to heat and vaporize the chemical 96 in a seemingly obvious manner.

It has been noted that two alternate forms of pistons 38 and 76 respectively and the imperforate one is used when liquid chemicals are employed and the other screened type is used in conjunction with the center tube when powders or crystals are used. The ports or orifices 36 in the tube 24 serve to permit the chemical mixture to be delivered into the tube and then carried by way of the hose 32 to the desired place of use.

The operation of the device is approximately as follows: Water will be piped into the bottom or lower chamber 50 (Fig. 2) by way of a hose 56 connected with a water tap and also with the valved fitting 52. As the water under pressure comes into this chamber the piston 38 is raised, causing the chemical media to be forced out through the ports 36 and hose line. Where more pressure is needed the source of heat may be brought into play and of course where the heat or lamp is employed the valve 54 is turned off so that the amount of water deposited in the chamber 50 is gradually converted into steam and the steam serves to raise the piston.

As already mentioned the device was primarily designed with the thought in mind of use as an exterminator and fumigator and it is practical for this purpose inasmuch as it can be readily seen that the simple manner in which the chemicals may be placed in the tank and the use of water allowing the water pressure to force the mixed water and chemicals out through the hose line is aptly attained.

It is further to be noted that the device differs from prior art adaptations in that it may be used with either a source of heat or cold water from a handy tap. Also the base, containing the source of heat, is detachable from the tank. Further, either liquids, powders or chemicals may be employed as a chemical media or product which is to be acted on and dispensed. With the available equipment described it will be clear that the device may be employed to produce a vapor, mist or spray a full stream of liquid. By reason of the pressure which is available under the construction shown a long hose may be used for spraying, for example, liquid fertilizer on lawns, or insecticides on plants, trees and flowers. Although the size will vary, experimental adaptations have shown that the chemical capacity in the tank should be about three gallons more or less. The firebox will be of convenient size and capable of holding any available economical heating device. Both parts are easily portable and light of weight.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and changes may be resorted to, falling within the scope of the invention as claimed.

What is claimed as new is as follows:

1. A multipurpose dispensing device comprising a closed cylindrical tank adapted to contain chemicals, a piston reciprocable in said tank and dividing the space in the tank into upper and lower chambers, the lower chamber beneath said piston being adapted to contain water and having a valved water delivery line communicatively joined thereto, and support means for said tank adapted to accommodate a suitable source of heat, whereby the water in said tank may be heated to generate steam, the latter serving to slide the piston upwardly in said tank and means at the top of said tank for dispensing the chemical in vaporized usable form.

2. The structure defined in claim 1, and wherein said support means is characterized by a base having a vented portion and adapted to contain a burner such as a lamp.

3. The structure defined in claim 1, and wherein said piston is characterized by an inverted circular pan-like portion which serves to effectually trap and utilize the steam pressure which is relied upon as the means to drive the piston upwardly in said tank.

4. A multipurpose dispensing device for use indoors comprising a closed cylindrical tank adapted to contain chemicals, a stop shoulder fixed in a lower portion of said tank, an inverted pan-like piston reciprocable in said tank and normally resting on said shoulder and dividing the tank into upper and lower chambers, the chemical media contained in said upper chamber, said lower chamber being adapted to contain water which, when heated, converts to steam, whereby to drive the piston progressively upward in said upper chamber, and means embodied in said tank for discharging the chemical media for whatever use desired.

5. The structure defined in claim 4 and a guide tube fixed axially to a top portion of the tank and depending into the tank, said piston being slidable on said tube, an upper confined portion of the tube having ports therein and an extreme upper end of the tube extending through and above said top portion to accommodate a dispensing hose.

6. The structure defined in claim 5, and wherein valved water supply means is attached to a lower portion of the tank to deliver water to said lower chamber.

7. A multipurpose device for dispensing purposes comprising a closed cylindrical tank, a stop shoulder fixed in a lower portion of said tank, an inverted pan-like piston reciprocable in said tank and normally resting on said shoulder and dividing the tank into upper and lower chambers, said upper chamber being adapted to contain chemical media, said lower chamber being adapted to contain water which, when heated, converts to steam, whereby to drive the piston progressively upward in said upper chamber, and means at a top portion of said tank for discharging the chemical media for whatever use may be desired, said piston having a central portion provided with a screen and a collar located at a central portion of the screen, said collar being slidable on said tube, and valved water supply means attached to a lower portion of said tank and serving to deliver water under pressure into the lower chamber for purposes of lifting the piston slowly so that it functions as a follower and simultaneously functions to deliver water into the upper chamber to mix with said chemical media.

No references cited.